United States Patent
Brunone

(10) Patent No.: US 10,906,745 B2
(45) Date of Patent: Feb. 2, 2021

(54) BELT CONVEYOR AND METHOD OF MOVING

(71) Applicant: René Brunone, Saint-Marcel (FR)

(72) Inventor: René Brunone, Saint-Marcel (FR)

( * ) Notice: Subject to any disclaimer, the term of this patent is extended or adjusted under 35 U.S.C. 154(b) by 0 days.

(21) Appl. No.: 16/345,559

(22) PCT Filed: Oct. 26, 2017

(86) PCT No.: PCT/EP2017/077508
§ 371 (c)(1),
(2) Date: Jul. 15, 2019

(87) PCT Pub. No.: WO2018/078047
PCT Pub. Date: May 3, 2018

(65) Prior Publication Data
US 2019/0337728 A1  Nov. 7, 2019

(30) Foreign Application Priority Data
Oct. 26, 2016 (FR) ..................... 16 60383

(51) Int. Cl.
*B65G 41/00* (2006.01)
*B65G 15/08* (2006.01)

(52) U.S. Cl.
CPC .......... *B65G 41/008* (2013.01); *B65G 15/08* (2013.01); *B65G 41/005* (2013.01); *B65G 2812/02029* (2013.01)

(58) Field of Classification Search
USPC .............. 198/303, 312, 314, 315, 316.1
See application file for complete search history.

(56) References Cited

U.S. PATENT DOCUMENTS

| | | | | |
|---|---|---|---|---|
| 1,426,706 A | * | 8/1922 | Beattie | B65G 65/22 198/307.1 |
| 1,743,878 A | * | 1/1930 | Brown | E02F 7/02 198/829 |
| 2,886,167 A | * | 5/1959 | Lanier, Jr. | B65G 17/02 198/303 |
| 2,955,699 A | * | 10/1960 | Lanier, Jr. | E21F 13/02 198/303 |

(Continued)

FOREIGN PATENT DOCUMENTS

| | | |
|---|---|---|
| DE | 3242769 A1 | 5/1984 |
| EP | 1350742 A1 | 10/2003 |

(Continued)

OTHER PUBLICATIONS

International Search Report for PCT Application No. PCT/EP2017/077508, dated Jan. 15, 2018 in 3 pages.

(Continued)

*Primary Examiner* — Joseph A Dillon, Jr.
(74) *Attorney, Agent, or Firm* — Knobbe, Martens, Olson & Bear, LLP

(57) ABSTRACT

A belt conveyor includes a longitudinal self-supporting belt, a number of belt support stations, each of which includes a base, a tower fixed on the base and belt support devices fixed on the tower. At least some support stations include devices to move the stations, and the belt support devices are fixed on the tower at a height above the ground greater than one meter.

15 Claims, 5 Drawing Sheets

(56) References Cited

U.S. PATENT DOCUMENTS

| | | | | |
|---|---|---|---|---|
| 3,361,248 A * | 1/1968 | Daymon | B65G 41/008 | 198/303 |
| 3,590,983 A * | 7/1971 | Oury | B65G 47/763 | 198/311 |
| 3,612,257 A * | 10/1971 | Goergen | B65G 41/008 | 198/309 |
| 3,675,762 A * | 7/1972 | Arndt | B60P 3/16 | 198/588 |
| 3,701,411 A * | 10/1972 | McGinnis | B65G 15/56 | 198/303 |
| 3,887,061 A * | 6/1975 | Hopkins | B65G 65/28 | 198/304 |
| 5,749,452 A * | 5/1998 | Kanenwischer | B65G 41/008 | 198/301 |
| 5,902,089 A * | 5/1999 | Sinn | A01K 45/005 | 198/313 |
| 6,155,400 A * | 12/2000 | Daigh | B65G 41/008 | 198/301 |
| 6,336,545 B1 | 1/2002 | Arndt et al. | | |
| 6,782,993 B2 * | 8/2004 | Bernard | B65G 41/008 | 198/300 |
| 7,647,664 B2 * | 1/2010 | Petermann | B65G 41/008 | 14/2.4 |
| 7,814,599 B2 * | 10/2010 | Brewka | B65G 65/28 | 14/2.4 |
| 8,251,199 B2 * | 8/2012 | Tebbe | B65G 65/28 | 198/301 |
| 10,106,329 B2 * | 10/2018 | Brunone | B65G 41/008 | |
| 2009/0071796 A1 * | 3/2009 | Petermann | B65G 41/008 | 198/304 |
| 2009/0095595 A1 * | 4/2009 | Brewka | B65G 41/008 | 198/312 |
| 2012/0048674 A1 * | 3/2012 | Smith | B65G 41/002 | 198/306 |
| 2012/0146387 A1 * | 6/2012 | Shatters | B65G 41/008 | 299/1.9 |
| 2012/0175219 A1 * | 7/2012 | Tebbe | B65G 65/28 | 198/301 |
| 2013/0118862 A1 * | 5/2013 | Stewart | B65G 21/12 | 198/300 |
| 2015/0298914 A1 * | 10/2015 | Emerson | B65G 41/008 | 198/301 |
| 2016/0114982 A1 * | 4/2016 | Lichtberger | B65G 41/005 | 198/311 |
| 2016/0115791 A1 * | 4/2016 | Oberdorfer | B65G 21/14 | 198/812 |
| 2016/0167888 A1 * | 6/2016 | Messina | B65G 41/008 | 198/315 |
| 2018/0194569 A1 * | 7/2018 | Tebbe | B65G 41/008 | |
| 2018/0251314 A1 * | 9/2018 | Wagner | B65G 21/06 | |
| 2018/0282074 A1 * | 10/2018 | Nothum, Jr. | A23P 20/12 | |

FOREIGN PATENT DOCUMENTS

| | | |
|---|---|---|
| JP | S60242115 A | 12/1985 |
| JP | 3914316 B2 | 5/2007 |

OTHER PUBLICATIONS

Search Report for French Application No. FR1660383, dated Jun. 28, 2017 in 2 pages.

* cited by examiner

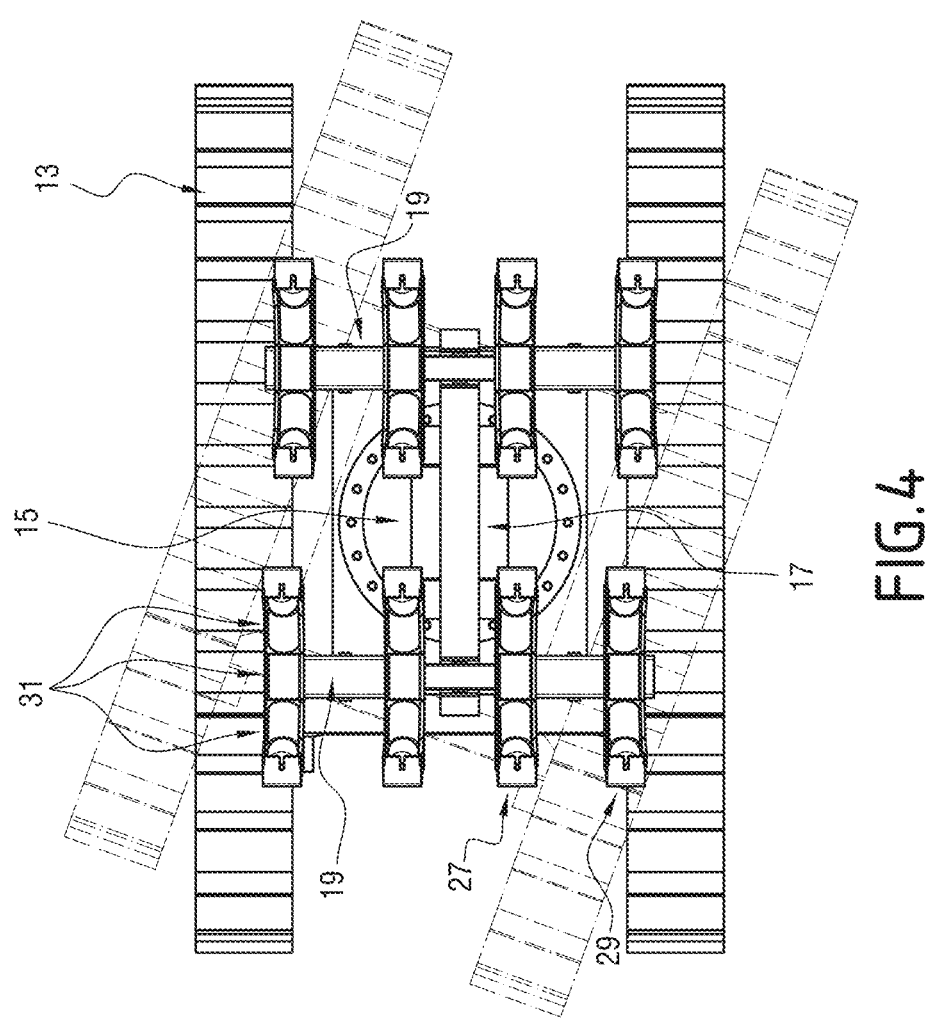

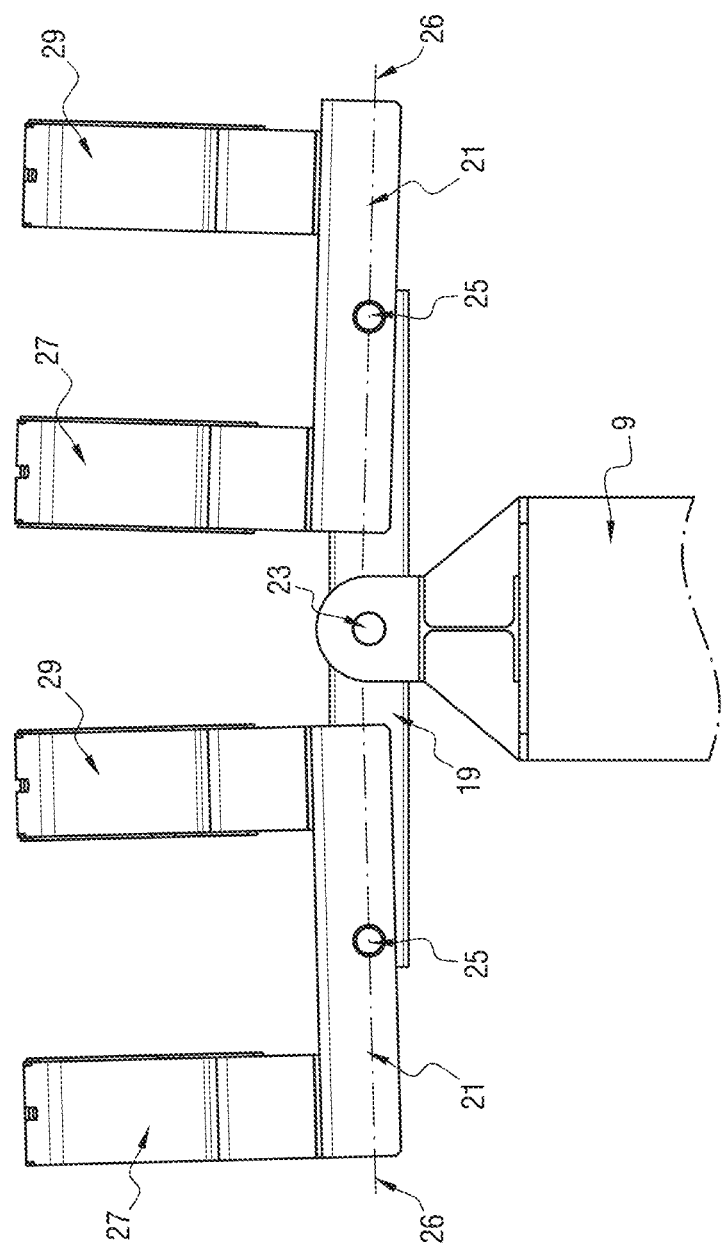

BELT CONVEYOR AND METHOD OF MOVING

CROSS-REFERENCE TO RELATED APPLICATIONS

This application is the U.S. National Phase under 35. U.S.C. § 371 of International Application PCT/EP2017/077508, filed Oct. 26, 2017, which claims priority to French Patent Application No. 16 60383, filed Oct. 26, 2016. The disclosures of the above-described applications are hereby incorporated by reference in their entirety.

FIELD OF THE INVENTION

The present invention generally relates to conveyor belts, in particular conveyors used for transporting materials such as, for example, ore, mine tailings or any other material that may be extracted from a mine or quarry. Such conveyors are used, for example, to transport such materials between the extraction zone and a storage area or a loading area for vehicles.

More specifically, according to a first aspect, the invention relates to a belt conveyor, of the type comprising a longitudinal self-supporting conveyor belt, a plurality of belt support stations, each support station comprising a base, a tower fixed on the base and devices for supporting the belt attached to the tower.

BACKGROUND OF THE INVENTION

EP1350742 discloses a belt conveyor of the aforementioned rippable type. The term "rippable conveyor" means a conveyor movable by sliding on the ground. The displacement is then generally effected transversely to the conveying direction. To do this, a string-like link is fixed, according to the conveying direction, on the support frames of the conveyor belt. The link is then successively transversely applied along its entire length by a motorized vehicle traveling in the longitudinal direction of the conveyor to cause the progressive movement of the support frame.

This type of rippable conveyor is, however, not easily movable. In fact, the transverse displacement of the conveyor belt is effected by successive displacement of the chassis. Implementation on land with topographic variations or variations in the nature of the soil (e.g. geological or soil properties) can be complicated. In addition, the presence of natural obstacles (e.g. lakes, rivers) or anthropogenic obstacles (e.g. roads, buildings) complicates the implementation of this type of conveyor even more.

SUMMARY OF THE INVENTION

One of the objects of the invention is to propose a conveyor belt whose movement on the ground is facilitated.

To this end, the invention relates to a conveyor belt of the aforementioned type, characterized in that at least some support stations comprise devices for moving the stations and in that the support devices of the belt are fixed on the tower at a height above ground level of more than one meter.

Thus, the displacement devices fixed on certain support stations of the belt facilitate the movement of the conveyor in the field by providing flexibility and speed of implementation on a site such as a mine or quarry.

The conveyor according to the invention may comprise one or more of the following characteristics, considered individually or in any technically feasible combination:

the devices for moving the support stations comprise tracks or wheels mounted on the base, each support station comprises a ball joint connection between the tower and the base and/or a connection between the tower and the base allowing pivoting about an axis extending in a direction perpendicular to the ground, the tower is telescopic, the support devices comprise a main arm extending in a main direction, at least one secondary arm attached to the main arm and extending in a secondary direction substantially perpendicular to the main direction, and at least one support of the belt fixed on the secondary arm, the, or each, secondary arm is fixed on the main arm by means of a connection allowing pivoting about an axis extending in the main direction, the, or each, support member of the belt is fixed to the secondary arm by means of a first connection allowing pivoting about an axis parallel to the main direction, the, or each, support member of the belt is fixed to the secondary arm by means of a second connection allowing pivoting about an axis perpendicular to the axis of rotation of the first pivoting connection, the conveyor comprises two mutually parallel secondary arms attached to each end of the main arm, each second arm bearing at least one support member, the, or each, secondary arm comprises two support members arranged along the secondary arm, the conveyor belt is closed loop, wherein the run of the belt rests on the, or each, support member borne by one of the secondary arms, while the return run of the belt rests on the, or each, support member of the other of the secondary arms, the, or each, support member comprises at least two support elements parallel to each other, each support element comprises a plurality of rollers defining a support cradle for the belt, some rollers are motorized.

According to a second aspect, the invention relates to a method of moving a belt conveyor having the above features, wherein the method comprises a step during which a plurality of belt support stations are moved.

The moving method may also have the feature that the movement of the support stations is manually performed by an operator or in an automated manner according to a computer programmed sequence.

BRIEF DESCRIPTION OF THE DRAWINGS

Other features and advantages of the invention will emerge from the detailed description which is given below, by way of indication and in no way limitative, with reference to the appended figures, wherein:

FIGS. 3 and 4 show an isometric view and a top view of the detail of a support station more precisely;

FIG. 5 shows the detail of a secondary arm of a support station in the longitudinal direction of the belt.

DETAILED DESCRIPTION OF THE PREFERRED EMBODIMENTS

Figure 1:
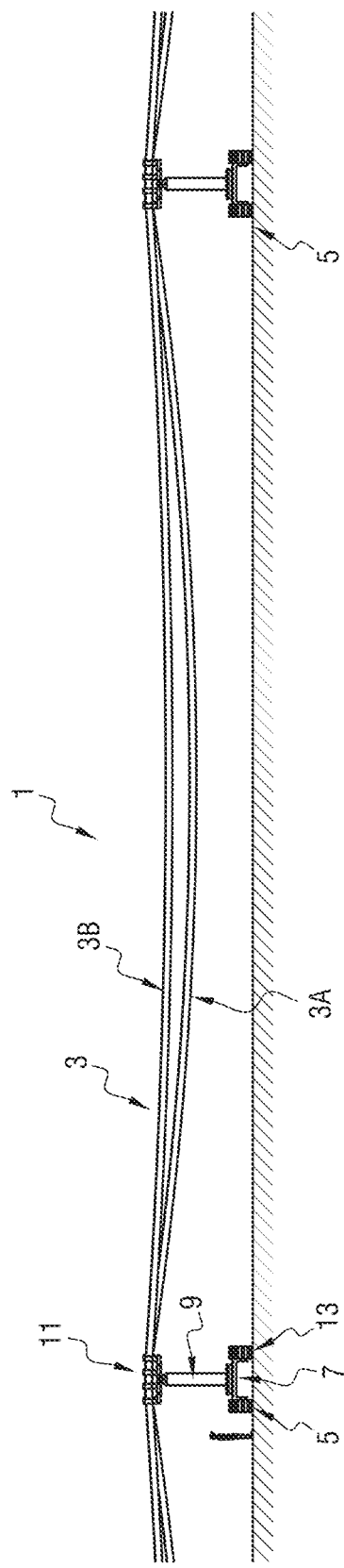
FIG. 1 shows a side view of a portion of the conveyor belt according to the invention.
Figure 2:
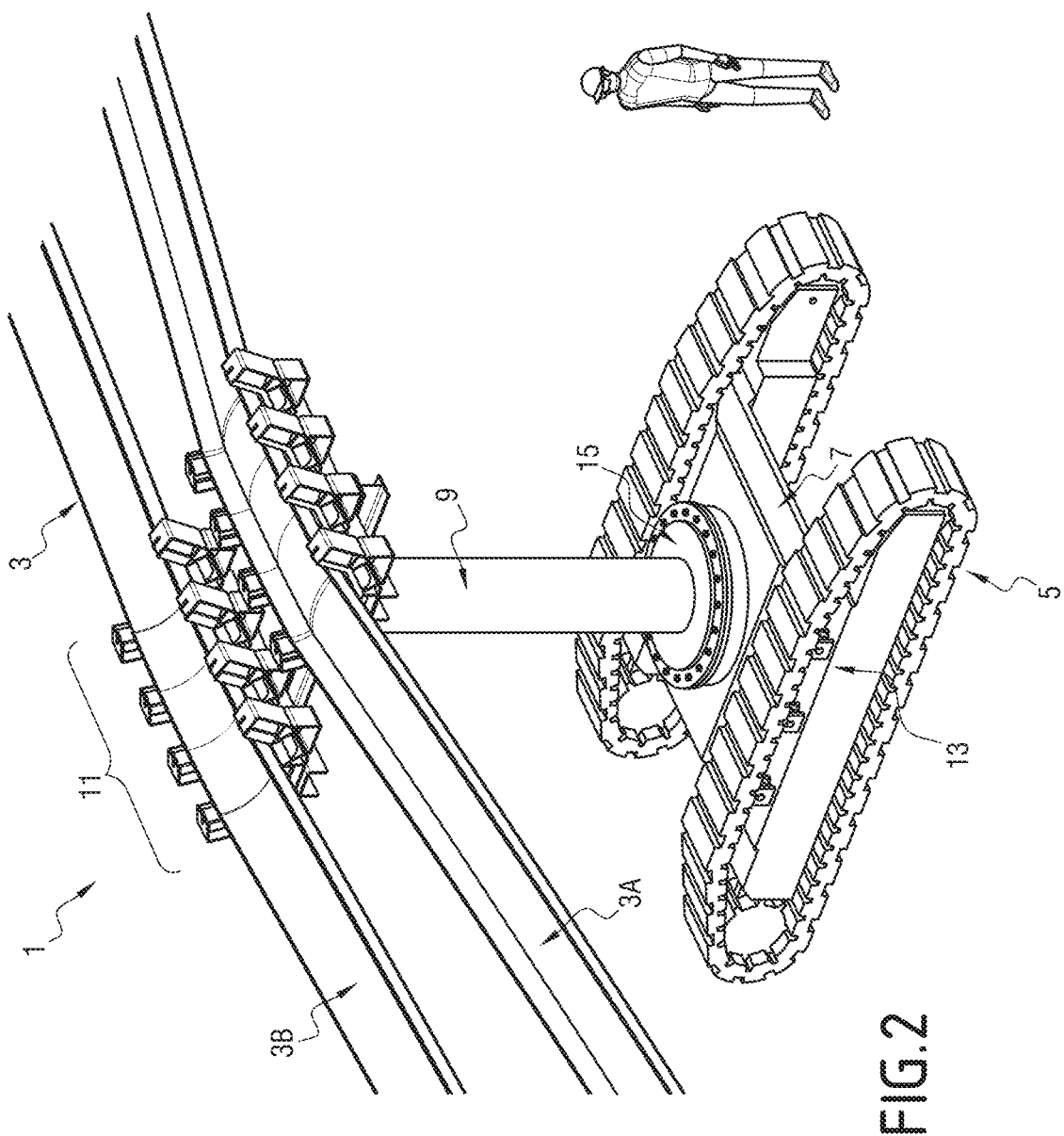
FIG. 2 shows an isometric view of the conveyor belt at a support station.

FIGS. 1 and 2 show a belt conveyor 1 which comprises a self-supporting longitudinal conveyor belt 3 for transporting divided materials such as ore, mine tailings, rubble or any other type of material. The conveyor has a plurality of support stations 5 distributed along the conveyor belt.

The term "self-supporting belt" means a conveyor belt which retains its half-cylinder shape at rest in the absence of external constraints to shape it.

For example, this type of belt comprises a matrix made of an elastic material and a reinforcement embedded in the matrix. The matrix is typically made of synthetic or natural rubber or PVC.

The reinforcement comprises, for example, longitudinal metal cables or an aramid textile fabric or any other textile having an elongation of between 0.2% and 2%. These cables are typically made of steel and have a very low load elongation, for example 0.2% to 0.3%. These cables extend over the entire length of the belt. They are typically uniformly distributed circumferentially in the section of the belt or on a circumferential portion. The reinforcement may also comprise, for example, in addition to longitudinal cables or an equivalent textile, transverse metal cables or aramid textile fabric or another textile. These cables are typically made of steel. They typically extend over most of the perimeter of the belt. The longitudinal and transverse cables may be, for example, interlaced with each other in a predetermined manner.

The self-supporting conveyor belt is manufactured in sections according to a vulcanization process. During this operation, each section is shaped around a core of suitable shape, then baked while remaining pressed against the core. The manufacture is carried out continuously, wherein each new section is molded and baked in order to constitute an extension of the belt portion already produced. The baking is carried out with the reinforcement embedded in the matrix. The armature is placed in the matrix before or during the shaping operation.

For example, the French patent applications filed by the applicant under the numbers 15 59277 and 15 59301 respectively describe such a self-supporting belt and its manufacturing process.

The half-cylinder shape of the belt 3 gives it advantages compared to a conventional belt. It has superior loading capacity. Its mechanical strength is increased and its rigidity is increased thanks to the beam effect.

The belt may thus travel over great distances (i.e. several kilometers for example) while minimizing the number of support stations of the belt.

Advantageously, the self-supporting conveyor belt may be open on its upper part, or closed to prevent, for example, transported materials falling off.

The self-supporting conveyor belt is typically a closed loop at its ends by means of rollers that are not shown in the figures.

The conveyor belt thus comprises a first material transport run 3A and a return run 3B, parallel to each other and extending in the longitudinal direction of the conveyor 1.

Thus, the belt may connect, for example, a material loading station located near a quarry and a material unloading station located near a processing or material conditioning plant and a transport infrastructure.

Each support station 5 comprises a base 7 on which is fixed a tower 9. Support devices 11 of the belt are fixed on the tower 9. The support devices 11 of the belt are fixed on the tower 9 at a height above ground greater than one meter, preferably greater than 2 meters, more preferably greater than 5 meters.

The maximum height of the support devices 11 is guided by regulatory, meteorological, architectural and/or economic constraints. The maximum height is, for example, 50 meters.

Typically, two consecutive support stations 5 along the conveyor belt are separated by a distance of between 10 and 1000 meters, preferably between 30 and 300 meters, and typically 50 meters.

The spacing between two consecutive support stations 5 and the height of the support devices are determined more precisely according to the nature of the ground and the topography of the terrain, the obstacles to be crossed, the diameter of the belt, the mass of the belt and the density of the materials transported. Obstacles to overcome may be natural (e.g. hills, forests, water bodies) or artificial (e.g. buildings, roads).

Furthermore, the height of the support devices 11 depends on the distance between two neighboring support stations 5. In fact, the greater the distance between two consecutive support stations 5, the greater are the support devices 11 of the belt fixed at a higher height relative to the ground, because the belt widening is more pronounced between two support stations 5.

Conversely, for reasons of regulatory, safety (i.e. falling of materials due to the wind) or aesthetic (i.e. landscape integration) or economic (i.e. cost of materials) aspects, the height of support devices 11 may be limited. In this case, the spacing between neighboring support stations 5 is chosen to keep the support devices below a maximum authorized height.

Advantageously, at least some support stations 5 may comprise devices 13 to move the stations.

The base 7 is typically a mechanically welded frame which rests on the ground with the displacement devices 13 serving as propulsion means. These displacement devices 13 may be, for example, wheels or tracks mounted on the base 7 of the support station 5 as illustrated in FIG. 1 to 4.

Advantageously, the base 7 may comprise a motor (not shown) that is integral with the base, to move the wheels or tracks.

A control device (not shown) makes it possible, for example, to control the movements of the support station 5 manually, for example by means of a control cabin fixed to the base 7. In a variant, the control of the movements of the station support 5 is effected remotely, for example by transmission of control commands by radio, wifi or any other wireless device or by a control box connected to the station by wire.

Advantageously, the tracks make it easier to move the support stations over uneven ground, i.e. terrain having a more or less significant topography. They also make it easier to move on very soft terrain such as sandy soils.

The tower 9 may be, for example, a tower formed by a steel tube.

Advantageously, the tower 9 of the support station 5 of the belt is fixed on the base 7 by a connection 15 allowing pivoting about an axis extending in a direction perpendicular to the ground.

For example, this pivotal connection 15 may be provided by a device similar to a construction machine turret.

This makes it possible to orient the support devices 11 of the belt in a preferred direction, in particular after the displacement of the support station 5 on the ground and according to topographical constraints.

Alternatively, the tower 9 of the support station 5 of the belt may be fixed on the base 7 by a ball joint. The tower 9 may comprise, for example, a spherical lower end which cooperates with a member forming a cage fixed on the base 7 of the support station 5.

This ball joint allows the tower 9 to be inclined relative to the direction perpendicular to the base 7.

The angle then formed between the direction of the tower 9 and the direction perpendicular to the base 7 is typically between 0° and 30°. The maximum angle of inclination must be chosen according to the length of the tower to avoid causing instability of the support station.

The ball joint allows, for example, the belt support station to be installed on a terrain having a certain gradient and to maintain the support devices 11 in a desired plane. For example, the inclination of the tower 9 may be a function of the position of the support devices 11 of the adjacent support stations 5.

According to another variant, the tower 9 of the support station 5 of the belt may be fixed on the base by a swivel and pivot type of connection according to the characteristics described above.

Advantageously, the tower 9 may be telescopic, which allows the height of the support devices of the belt to be increased or decreased relative to the ground.

Thus, the height of the support devices with respect to the ground may be adapted to the external constraints described above such as natural or anthropogenic obstacles.

Figure 3:
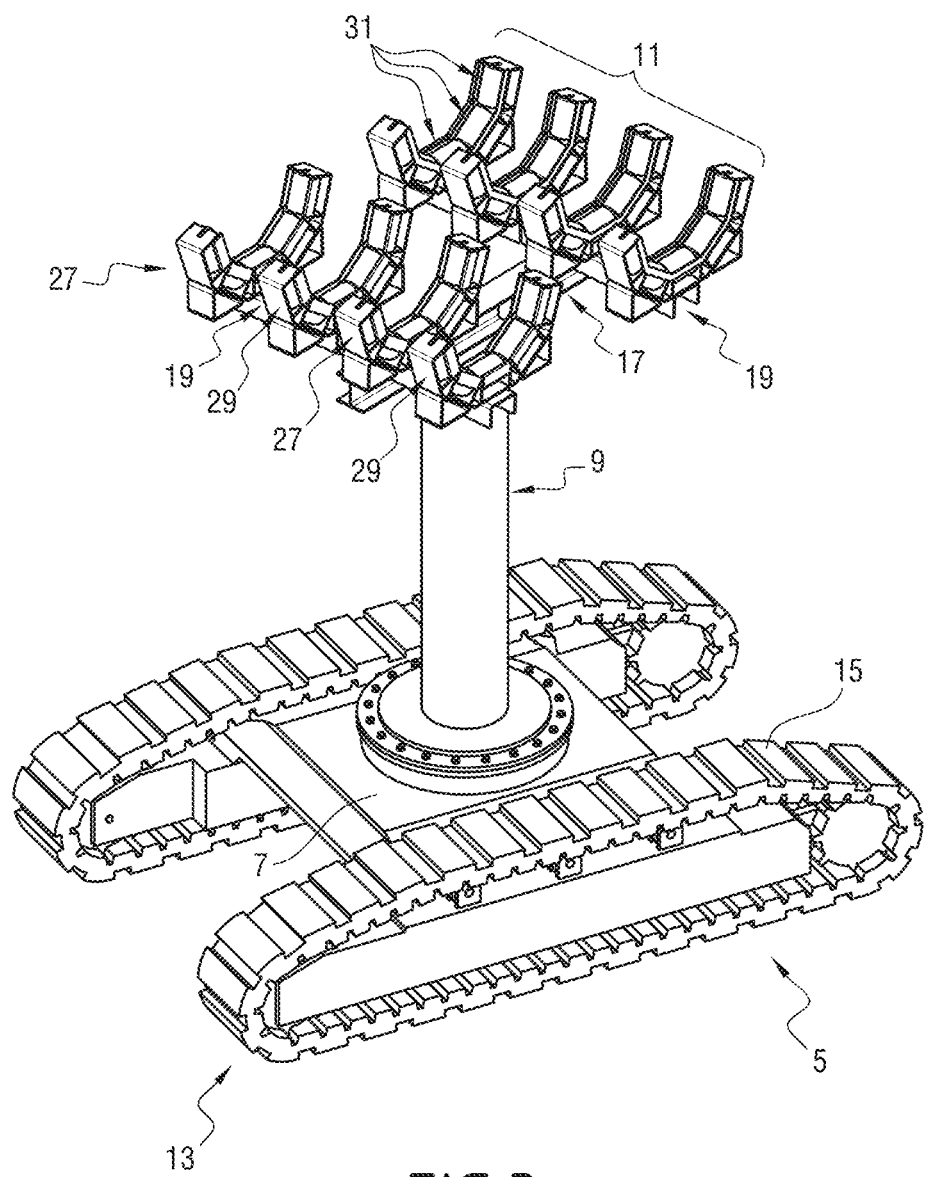

As may be seen in FIGS. 2 and 3, the support devices 11 preferably each comprise a main arm 17 extending in a so-called main direction, at least one secondary arm 19 fixed to the main arm and extending in a substantially secondary direction perpendicular to the main direction. The, or each, secondary arm comprises at least one support member 21 of the belt fixed thereon (FIG. 5).

The main arm 17 is typically integrally fixed on the tower 9 of the support station 5 without any degree of freedom. The main arm 17 extends in a direction perpendicular to the direction of the tower 9.

The main arm 17 may be, for example, a steel beam of square or rectangular section.

As may be seen in FIG. 5, the, or each, secondary arm 19 is typically attached to the main arm 17 by means of a connection 23 allowing pivoting about an axis extending in the main direction.

The movement around the pivot connection 23 described above is free. Thus, the, or each, secondary arm 19 may oscillate freely about its axis.

The, or each, secondary arm 19 may be, for example, a steel beam or an inverted U-shaped steel part.

Typically, as may be seen in FIG. 5, the, or each, support member 21 of the belt may be fixed on the secondary arm 19 by means of a first connection 25 pivoting about an axis parallel to the main direction.

Typically, the, or each, support member 21 of the belt may be fixed to the secondary arm 19 by means of a second connection 26 pivoting about an axis perpendicular to the axis of rotation of the first pivoting connection 25.

Advantageously, as may be seen in FIG. 3, each support station 5 of the belt comprises two parallel arms 19, parallel to one another, and fixed to each end of the main arm 17.

Each secondary arm 19 advantageously comprises at least two support members 21 arranged along the secondary arm 19, on either side of the pivoting connection 23.

As for the pivoting connection 23 described above, the movement of each support member 21 is free around its first pivotal connection 25 and its second corresponding pivoting connection 26.

Thus, the movements around the pivotal connections 23, 25 and 26 are not imposed by any external constraint other than those of the conveyor belt. The oscillations of the, or each, secondary arm 19 and the support members 21 depend, for example, on the mass of material present on the belt, or the height of the belt support devices 11 of the support station relative to the height of the support devices from previous stations or from subsequent stations.

Each support member 21 comprises two support members 27 and 29 parallel to each other and substantially perpendicular substantially to the secondary direction.

The spacing between each support element 27 and 29 of a support member 21 is fixed.

Each support element 27 and 29 comprises rollers 31 visible in FIGS. 3 and 4. Each element 27 and 29 forms a trough-like support and guide cradle for a longitudinal section of the belt. Each support element 27 and 29 has at least four rollers 31, preferably five rollers 31. These rollers 31 are distributed circumferentially along the lower half of the perimeter of the belt.

Alternatively, the rollers 31 are replaced by pads which have a surface on which the conveyor belt slides.

Some support stations 5 may comprise belt drive devices. These drive devices, which are not shown in the figures, may comprise, for example, gear motor assemblies fixed on the base 7, on the tower 9, or at each support element 27 and 29.

These gear motors drive the rollers 31 in rotation and can drive the belt 3A and 3B.

Advantageously, the gear motors are able to drive the rollers 31 in one direction of rotation or in another depending on the direction of movement of the conveyor belt.

Alternatively, the conveyor may be equipped with motor rollers, i.e. each roller 31 comprises inside its structure a gear motor driving the roller 31 in rotation.

Thus, all the support stations 5 do not systematically comprise belt drive devices. The support stations 5 which comprise the drive devices 13 may be chosen, for example, according to the topographic profile followed by the conveyor and the loading the belt in order to facilitate the movement of the belt.

According to the invention, at least a portion of the belt conveyor 1 may be moved in the field by moving, successively or concomitantly, a plurality of support stations 5, for example in a direction transverse to the longitudinal direction of the belt.

This movement may be carried out manually by the intervention of an operator or in an automated manner according to a computer-programmed movement sequence.

In this case, the trajectory of the support stations 5 may be, for example, optimized according to the external constraints such as, for example, the topography of the site or the natural or artificial obstacles.

The invention offers many advantages. In fact, it offers considerable flexibility of implementation on a site such as a mine or a quarry. The support stations 5 of the conveyor belt may be moved easily thanks to the displacement devices 13 fixed on each support station 5 whatever the topography of the site and the nature of the ground.

The support stations 5 may thus be moved over ground that is soft or has an irregular surface, for example stony. Advantageously, the support stations 5 may be moved to avoid or circumvent certain natural or anthropogenic obstacles.

The use of support stations which comprise telescopic and/or tilting towers relative to the plane of the base station 7, as described above, makes the invention particularly flexible and modulable. The implementation of the conveyor on the ground is facilitated.

The belt support devices as described above also provide flexibility in the use of the conveyor according to the invention.

In fact, each of the secondary arms 19 and each of the support members 21 accompany the movement of the belt. These arrangements facilitate, for example, the movement of the belt.

The invention may have, for example, a particular interest for use on a large open pit extraction site. In fact, in this type of installation, the conveyors must follow the evolution and the advancement of the point of extraction.

Thus, in operation, an extraction machine, such as a gear excavator, moves as it digs the ground. Therefore, it is necessary that the system for conveying the materials extracted from the ground to the treatment facility is mobile and moves at the same speed as the mining machine.

The conveyor according to one embodiment of the invention also makes it possible to optimize transport on an extraction site. In fact, each support station 5 comprises two secondary arms 19, while the support members 21 each support a run of the conveyor belt. These two runs circulate in parallel, the first run 3AA flowing in one direction and the second run 3B flowing in the opposite direction.

In fact, on a phosphate extraction site, the amount of non-exploitable material (i.e. sterile material) is close to 60% of the quantity extracted. The advantage of the two-way conveyor according to the invention is that the non-exploitable products may be returned directly to the point of extraction and partially fill the cavities left by the excavation as the excavator moves on.

Of course other embodiments of the invention may be envisaged.

What is claimed is:

1. A belt conveyor comprising:
    a longitudinal self-supporting belt, said belt having a half-cylinder shape, and
    a plurality of belt support stations wherein each support station comprises a base, a tower fixed on the base and belt support devices fixed on the tower,
    wherein at least some support stations comprise devices to displace the stations, and
    wherein the support devices of the belt are fixed on the tower at a height above ground greater than one meter, each support device comprises:
        a main arm extending in a main direction,
        at least one secondary arm fixed to the main arm and extending in a secondary direction perpendicular to the main direction, and
        at least one belt support member fixed on the secondary arm, the or each secondary arm being fixed on the main arm by means of a connection pivoting about an axis extending in the main direction.

2. The belt conveyor according to claim 1, wherein the displacement devices of the support stations comprise tracks or wheels mounted on the base.

3. The belt conveyor according to claim 1, wherein each support station comprises a ball joint connection of the tower to the base and/or a connection between the tower and the base pivoting about an axis extending in a direction perpendicular to the ground.

4. The belt conveyor according to claim 1, wherein the tower is telescopic.

5. The belt conveyor according to claim 1, wherein the, or each, belt support member is attached to the secondary arm by means of a first connection pivoting about an axis parallel to the main direction.

6. The belt conveyor according to claim 5, wherein, or each, belt support member is attached to the secondary arm by means of a second connection pivoting about an axis perpendicular to the axis of rotation of the first pivoting connection.

7. The belt conveyor according to claim 1, wherein it comprises two secondary arms parallel to each other and fixed to each end of the main arm, each secondary arm bearing at least one support member.

8. The belt conveyor according to claim 1, wherein the, or each, secondary arm comprises two support members arranged along the secondary arm.

9. The belt conveyor according to claim 1, wherein the belt forms a closed loop comprising a forwards run and a return run, wherein the forwards run of the belt rests on the, or each, support member borne by one of the secondary arms, while the return run of the belt rests on the, or each, support member of the other of the secondary arms.

10. The belt conveyor according to claim 1, wherein the, or each, support member comprises at least two support elements parallel to each other.

11. The belt conveyor according to claim 10, wherein each support element comprises a plurality of rollers defining a support cradle for the belt.

12. The belt conveyor according to claim 11, wherein some rollers are motorized.

13. A method of moving a belt conveyor according to claim 1, wherein the method comprises a step during which a plurality of belt support stations is moved.

14. The method according to claim 13, wherein the displacement of the support stations is manually performed by an operator or in an automated manner in a computer programmed sequence.

15. A belt conveyor comprising:
    a longitudinal self-supporting belt, said belt having a half-cylinder shape,
    a plurality of belt support stations wherein each support station comprises a base, a tower fixed on the base and belt support devices fixed on the tower,
    wherein at least some of the support stations comprise devices to displace the stations, and
    wherein the support devices of the belt are fixed on the tower at a height above ground greater than one meter, the support devices comprising a main arm extending in a main direction, exactly two secondary arms fixed to the main arm and extending in a secondary direction perpendicular to the main direction, and at least one belt support member fixed on each of the secondary arms, the belt forming a closed loop comprising a forwards run and a return run, and
    wherein the forwards run of the belt rests on the, or each, support member borne by one of the secondary arms, while the return run of the belt rests on the, or each, support member of the other of the secondary arms.

* * * * *